United States Patent [19]

Lengsfeld et al.

[11] Patent Number: 4,556,132
[45] Date of Patent: Dec. 3, 1985

[54] ADJUSTABLE ELECTROMAGNETIC CLUTCH/BRAKE

[75] Inventors: Karl Lengsfeld, Plankstadt; Erich Link, Brühl; Hans Erndt, Wiesloch, all of Fed. Rep. of Germany

[73] Assignees: Frankl & Kirchner GmbH & Co.; KG Fabrik fur Electromotoren u. Electrische Apparate, both of Schwetzingen, Fed. Rep. of Germany

[21] Appl. No.: 402,351

[22] Filed: Jul. 27, 1982

[30] Foreign Application Priority Data

Aug. 4, 1981 [DE] Fed. Rep. of Germany ....... 3130819

[51] Int. Cl.[4] ...................... B60K 41/24; F16D 13/75
[52] U.S. Cl. .......................... 192/12 BA; 192/110 R
[58] Field of Search ................. 192/18 B, 18 A, 18 R, 192/12 C, 12 D, 110 R, 70.25, 12 BA

[56] References Cited

U.S. PATENT DOCUMENTS

| | | | |
|---|---|---|---|
| 3,253,686 | 5/1966 | Scheuerer | 192/18 R |
| 3,387,157 | 6/1968 | Cook et al. | 192/18 R |
| 3,410,380 | 11/1968 | Kooistra | 192/18 B |
| 3,512,618 | 5/1970 | Schafer | 192/18 B |
| 3,543,901 | 9/1968 | Lengsfeld | |
| 3,750,781 | 8/1973 | Lengsfeld | 192/18 B |

FOREIGN PATENT DOCUMENTS

749148 12/1966 Canada .
2231501 6/1972 Fed. Rep. of Germany .

*Primary Examiner*—George H. Krizmanich
*Attorney, Agent, or Firm*—Browdy and Neimark

[57] ABSTRACT

An electromotive control drive mechanism, in particular for industrial sewing machines, comprises a continuously drivable motor and a brake/clutch unit connected therewith. A clutch disk connected in a rotationally fixed manner with a driven shaft can, by axial movement and by overcoming a clutch air gap, be brought into frictional engagement with a clutch support which is connected in a rotationally fixed manner with the rotor of the motor. A brake disk connected in a rotationally fixed manner with the driven shaft can be brought into frictional engagement with a brake support which is rotationally fixed. A clutch coil and a brake coil are also provided. In order to reduce the expense of the brake/clutch unit without burdensome actuation noises arising, only one clutch/brake disk is provided, and mechanisms are provided for adjusting the clutch air gap and the automatic readjustment of the clutch air gap.

18 Claims, 7 Drawing Figures

ADJUSTABLE ELECTROMAGNETIC CLUTCH/BRAKE

FIELD OF THE INVENTION

The present invention relates to an electromotive control drive mechanism, in particular for industrial sewing machines, comprising a continuously drivable motor and a brake/clutch unit connected with the motor. A clutch disk is connected in a rotationally fixed manner with a driven shaft and, by moving axially and overcoming a clutch air gap, can be brought into frictional engagement with a clutch support, which is connected in a rotationally fixed manner with the rotor of the motor. A brake disk is also connected in a rotationally fixed manner with the driven shaft and can be brought into frictional engagement with a rotationally fixed brake support. The mechanism includes a clutch coil and a brake coil.

BACKGROUND OF THE INVENTION

The brake/clutch unit of the well-known drive mechanism of the general type described above has a separate brake disk and clutch disk, which can be brought into frictional engagement, independently of one another, with the brake support and clutch support, respectively. The clutch and brake disks are either rigid in embodiment and displaceable on the driven shaft by means of a gear, or else axially resilient in embodiment and firmly connected with the driven shaft in the axial direction. Providing two such disks is expensive in terms of money as well as of manufacturing and construction effort and requires increased space. Since drive mechanisms of this kind are actuated extremely frequently —up to 30,000 operations comprising clutch engagement and braking occur in the course of one 8—hour shift-it is particularly important to minimize the noises associated with these actuations.

DISCUSSION OF PRIOR ART

An electromagnetically actuatable clutch/brake assembly is known from German laid-open application DE-OS 22 31 501, in which a clutch disk is disposed on a driven shaft such that it is rotationally fixed but axially displaceable. On one side, the disk has a clutch lining, and upon the excitation of a clutch magnet the disk can be brought into engagement with a rotating clutch support, for instance the flywheel mass of a motor. On its other side, the clutch disk is provided with a brake lining, and when the clutch magnets are not excited the brake lining is brought into engagement, by means of pre-stressed springs, with a brake support which is attached to the housing. An embodiment of this kind is not suitable for a control drive mechanism of the general type described at the outset, because regulated braking is not possible. Furthermore, this embodiment is again associated with a substantial amount of actuation noise.

An electromotive control drive mechanism of the general type discussed at the outset is known from Canadian Pat. No. 749,148. Here the clutch coil and brake coil are both disposed in an outer bearing bracket which serves simultaneously as the clutch bearing bracket and the brake bearing bracket.

SUMMARY OF THE INVENTION

It is accordingly the object of the invention to embody a drive mechanism of the general type discussed above such that the expense of the brake/clutch unit is reduced without burdensome actuation noises occurring.

This object is attained by the invention in that one common clutch/brake disk is provided, which assures that when the clutch is engaged the brake will always be released at the same time. The opportunity of adjusting the clutch air gap assures that the shifting distances and thus the noises of impact when the clutch is being engaged will be quite limited. It is possible to adjust a clutch air gap between the clutch lining and the clutch face on the clutch support to a dimension of approximately 0.1 mm.

Another object of the invention is to assure that variations in the width of the clutch air gap during operation, caused for example by thermally dictated expansion of the clutch lining, are automatically compensated for.

The invention teaches a basic principle by which the adjustment of the clutch air gap is accomplished in a particularly advantageous manner.

According to another object of the invention, it is attained that the adjustment of the clutch air gap can be accomplished from outside the mechanism.

According to yet another object, an opportunity is provided for adjusting the clutch air gap in one of the two basic types of clutch/brake units discussed at the outset above.

Still another object permits adjusting the gap between the brake lining and the brake support, or in other words of adjusting the force with which the brake lining, in its position of rest, presses against the brake support.

According to a further object, the invention achieves readjustment of the clutch air gap during operation.

To achieve other objects, the invention teaches numerous structure arrangements for adjusting the clutch air gap, and several variants of means for clutch readjustment and brake adjustment.

One form of the invention has only a single adjusting device, is structurally inexpensive, easy to service and easy to manipulate. Because of the flat spring characteristic curve, the clutch/brake disk presses with a virtually constant force against the brake support when the brake coil is not excited, regardless of the setting of the clutch air gap.

Further advantages and characteristics of the invention will become apparent from the ensuing detailed description of some preferred exemplary embodiments, taken in conjunction with the drawings.

DESCRIPTION OF THE PREFERRED EMBODIMENTS

Figure 1:
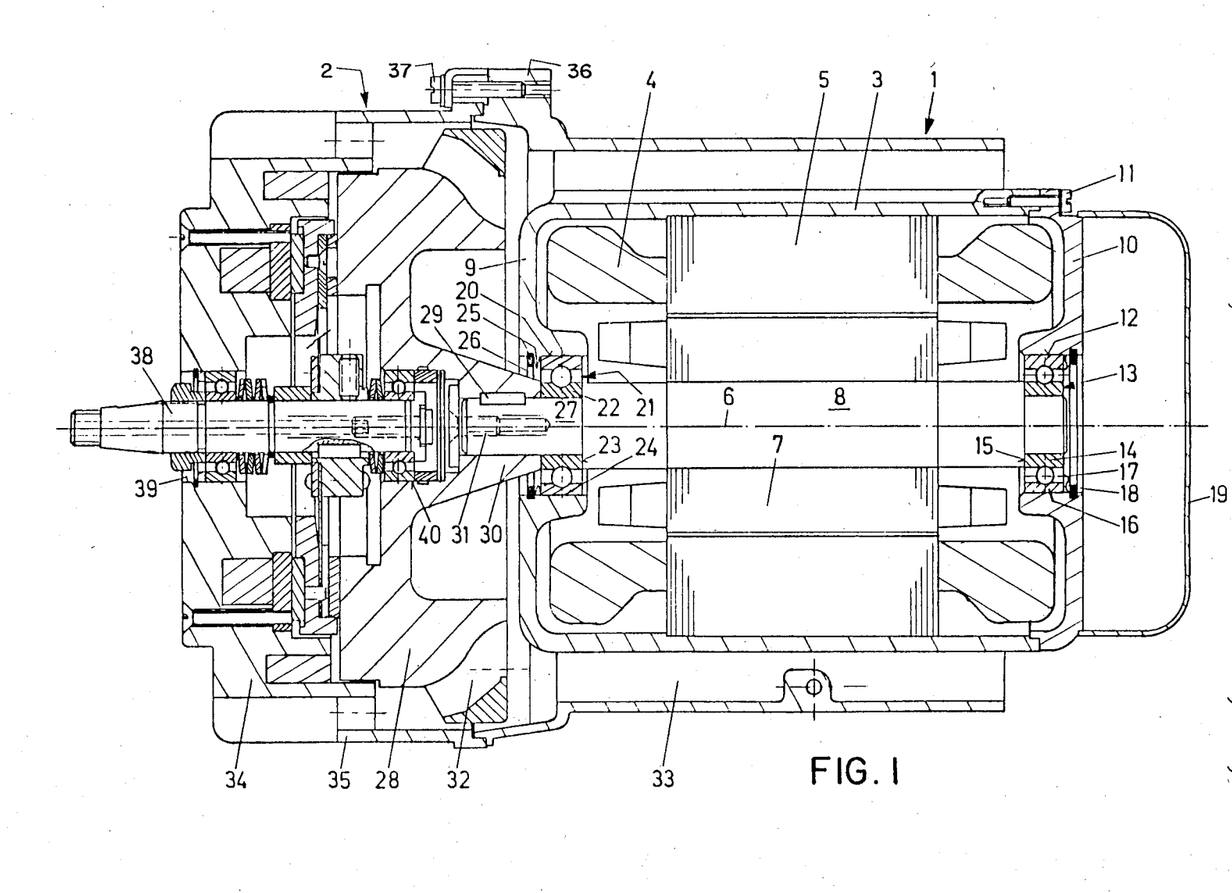
FIG. 1 shows a drive mechanism according to the present invention, comprising a motor and a brake/clutch unit, seen in an axial longitudinal section.

The drive mechanism shown in the drawings comprises a motor 1 and a brake/clutch unit 2. The motor 1 has a substantially cylindrical stator housing 3, in which a stator made up of stator windings 4 and a stator lamination packet 5 is concentrically disposed in the conventional manner. A rotor 7, which is mounted on a motor shaft 8, is also disposed concentrically with respect to the central longitudinal axis 6. The motor shaft 8 is supported in bearing brackets 9, 10. The bearing bracket 10 remote from the brake/clutch unit 2 is releasably secured to the stator housing 3 by means of screws 11. The motor shaft 8 is supported in the bearing bore 12 of the bearing bracket 10 by means of a rolling bearing 13, in this case an axial ball bearing; the inner ring 14 of the rolling bearing 13 is supported on a collar 15 of the motor shaft 8. On the other axial end, the outer ring 16 of the rolling bearing 13 is supported via an annular spring 17 against a fastening ring 18 fixed within the bearing bore 12, so that on the one hand the rolling bearing 13 is secured against axial movement on the motor shaft 8, yet on the other hand, axial readjustment movements of the motor shaft 8 are possible to the extent of the play predetermined by the annular spring 17. The bearing bracket 10 and in particular its bearing bore 12 are capped by a covering hood 19.

The other bearing bracket 9, adjacent to the brake/clutch unit 2, is embodied in one piece with the stator housing 3, as a result of which the stator housing 3 is cup-shaped. In the bearing bore 20 of this bearing bracket 9, the motor shaft 8 is again supported via a rolling bearing 21 embodied as an axial ball bearing, and here again the inner ring 22 of the rolling bearing 21 rests against a collar 23 of the motor shaft 8, while the outer ring 24 of the rolling bearing 21 is supported on the other side, that is, the side oriented toward the brake/clutch unit 2, via an annular spring 25 against a fastening ring 26 fixed within the bearing bore 20. On the shaft tang 27 of the motor shaft 8 on which the rolling bearing 21 is disposed, a disk flywheel 28 is also fixed in position in a rotationally fixed manner by means of a tongue-and-groove connection 29. The disk flywheel 28 rests with its hub 30 against the inner ring 22 of the rolling bearing 21 and is axially clamped firmly against the inner ring 22 by means of a screw connection 31, as a result of which it is simultaneously fixed axially with respect to the motor shaft 8. The disk flywheel 28 is embodied as a fan in its outer portion; to this end, it has fan blades 32, which aspirate cooling air through an annular conduit 33 disposed around the stator housing 3, simultaneously cooling the stator housing 3, and blows the air past a brake bearing bracket 34 which is also to be cooled.

The brake/clutch unit 2 has an approximately cylindrical housing 35, which is embodied in one piece with the brake bearing bracket 34, so that this housing 35 is again cup-shaped in general. It is releasably secured by means of screws 37 to a corresponding flange 36 on the stator housing 3. A driven shaft 38 disposed coaxially with respect to the central longitudinal axis 6 is supported at one end in a bearing bore 39 of the brake bearing bracket 34 and at the other in a bearing bore 40 in the disk flywheel 28, being freely rotatable with respect to the disk flywheel 28. The driven shaft 38 is also supported, via respective rolling bearings 41, 42 embodied as axial ball bearings, in the bearing bores 39, 40. see FIG. 2, A clutch/brake disk 43 is fixed on the driven shaft 38 in a rotationally fixed manner between the rolling bearings 41, 42 by means of a tongue-and-groove connection. The clutch/brake disk 43 has a hub 45, which is connected in a rotationally fixed manner as shown with the driven shaft 38, and an outer armature ring 46, which is connected with the hub 45 by means of an axially resilient spider 47. An embodiment of this kind is known from German Pat. No. 16 25 715 (corresponding to U.S. Pat. No. 3,543,901). The axial fixation of the hub 45 will be discussed again further below.

Figure 2:
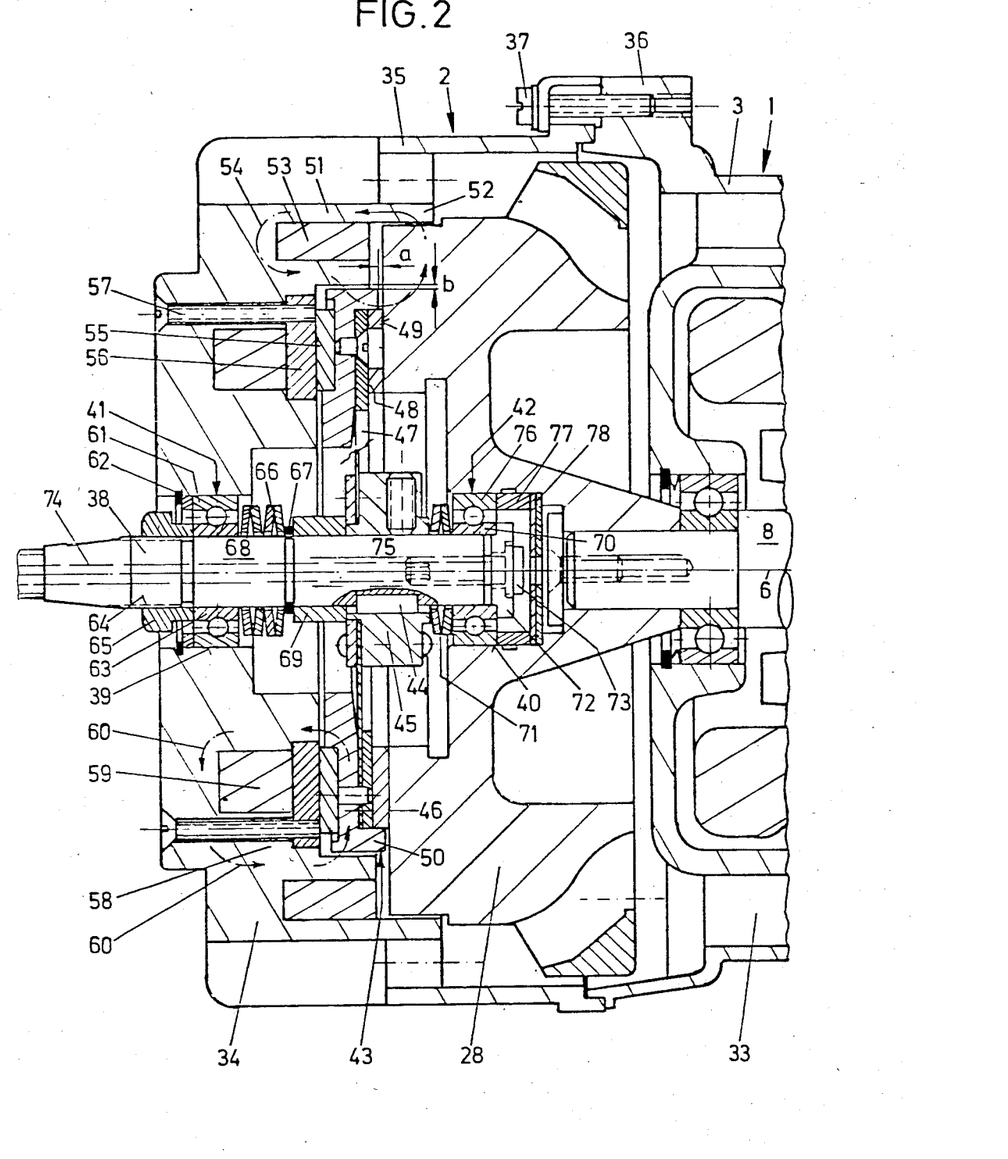
FIG. 2 shows the clutch/brake unit of FIG. 1 on an enlarged scale.

On the side of the armature ring 46 oriented toward the disk flywheel 28, an annular friction lining serving as a clutch lining 48 is secured, for instance by gluing, on the armature ring 46 or on the portion of the spider 47 oriented toward the armature ring 46. A corresponding annular clutch face 49 on the end face of the disk flywheel 28 facing it is oriented toward the clutch lining 48. The armature ring 46 has on its outer circumference an annular strut 50 protruding axially with respect to the disk flywheel 28. The annular strut 50 extends as far as the disk flywheel 28 with a slight axial gap "a" of only a few tenths of a millimeter.

The brake bearing bracket 34 has a clutch coil housing 51, which radially surrounds the armature ring 46 with a narrow radial gap b, again only a few tenths of a millimeter in width, and with a radially outer, annular housing strut 52 surrounds a portion of the disk flywheel 28, again leaving a narrow gap only a few tenths of a millimeter in width. An annular electromagnetic clutch coil 53 is disposed in the clutch coil housing 51 of the stationary brake bearing bracket 34. When this clutch coil 53 is excited, a magnetic path 54 from the clutch coil housing 51 and passing through the annular strut 50 of the armature ring 46, the disk flywheel 28 and the housing strut 52 and back to the clutch coil housing 51 is closed; as a result, the clutch/brake disk 43 is pressed with its clutch lining 48 against the clutch face 49 of the disk flywheel 28, which in this respect serves as a clutch disk.

On the side remote from the disk flywheel 28, the armature ring 46 is provided with a friction lining serving as a brake lining 55, which is likewise secured to the armature ring 46 by gluing or the like. Associated with it in the brake bearing bracket 34 is an annular brake support 56, which is secured to the brake bearing bracket 34 by means of screws 57. The brake support 56 is made of a nonmagnetic material. A brake coil housing 58 is embodied in the brake bearing bracket 34 in the vicinity of the brake support 56, and an annular brake coil 59 is located therein and is covered on the side of clutch/brake disk 43 by the brake support 56. Upon excitation of the brake coil 59 a magnetic path 60 is formed which, beginning at the brake coil housing 58, passes via the part of the clutch coil housing 51 radially surrounding the armature ring 46, the annular strut 50 of the armature ring 46, and the armature ring itself, back to the brake coil housing 58 and draws the clutch/brake disk 43 with its brake lining 44 against the brake support 56. Since the latter element is made of nonmagnetic material, it is not penetrated by the magnetic path 60. The armature ring 46 and the brake bearing bracket 34, which is embodied in one piece with the clutch coil housing 51 and the brake coil housing 58, are made of magnetic material, either alloyed or unalloyed iron. The disposition of the clutch coil 43 and the brake coil 59 and the associated magnetic poles in a common housing which also serves as the brake bearing bracket 34 and as the clutch bearing bracket as well, was accomplished such that as a result of the excitation of one magnetic circuit, the other magnetic circuit is not affected in any way that could have a disadvantageous effect on the regulating circuits subsequent to it in the system. This embodiment furthermore presents great advantages in terms of cost and space requirements.

The outer ring 61 of the rolling bearing 41 supported in the brake bearing bracket 34 is axially fixed on the outside by means of a fastening ring 62 fixed within the bearing bore 39. The inner ring 63 of this rolling bearing 41 rests against an adjusting nut 65 threaded from the outside onto a thread 64 of the driven shaft 38. On the side oriented toward the clutch/brake disk 43, the inner ring 63 of this rolling bearing 41 is supported via elastic members, for instance plate springs 66, against a fastening ring disposed on the driven shaft 38 and serving as an axially fixed stop 67. These elements together make up a brake adjustment device 68.

The hub 45 is supported from the other end via a spacer sleeve 69 against the stop 67 embodied by a fastening ring.

The inner ring 70 of the rolling bearing 42 supported in the disk flywheel 28 is supported at one end via an elastic member embodied by plate springs 71 against the hub 45 and on the other end against a support 72, which is axially held and adjusted relative to the driven shaft 38 by means of a coaxially disposed adjusting screw 73, which is disposed in a through bore 74 in the driven shaft and can be rotated from the outside by means of a screwdriver or an Allen wrench and can thus be axially adjusted. This embodiment makes up a clutch adjustment device 75.

The outer ring 76 of the rolling bearing 42 rests freely with respect to the clutch/brake disk 43, and on its other side it rests via a support ring 77 against a readjusting member 78, in this case a bimetallic member. This element in turn is supported on the bottom of the associated bearing bore 40.

By appropriately rotating the adjusting nut 65, or in other words by the appropriate actuation of the brake adjustment device 68, the axial position of the driven shaft 38 and thus the axial position of the clutch/brake disk 43 axially fixed onto the driven shaft 38 is adjusted relative to the brake bearing bracket 34. As a result, the air gap between the brake lining 55 and the brake support 56 when the brake coil 59 is unexcited is fixed. The air gap between the clutch face 49 and the clutch lining 48 when the clutch coil 53 is unexcited is adjusted by means of the rotation of the adjusting screw 73, or in other words by actuating the clutch adjustment device 75. The brake air gap is generally zero when there is a slight pressure force being exerted.

As the disk flywheel 28 warms up, the readjustment member 78, that is, the bimetallic ring, assumes a curvature such that the support ring 77, and thus the outer ring 76 of the rolling bearing 42, are deflected relative to the disk flywyeel 28 and pushed out of it. Since the rolling bearing 42 is stationary with respect to the hub 45, the disk flywheel 28 is therefore displaced toward the right together with the motor shaft 8, that is, toward the remote bearing bracket 10. This is possible because the two outer rings 16 and 24 of the two rolling bearings 13, 21 are supported in a resilient manner via the annular springs 17 and 25, respectively. Naturally the spring force of the plate springs 71 must be notably greater than the spring force of the annular springs 17 and 25. In this manner, the air gap between the clutch lining 48 and the clutch face 49 of the disk flywheel 28 is held approximately constant, since given the continuous contact of the clutch lining 48 against the disk flywheel 28, heating occurs and causes the readjustment movement described above.

Figure 3:
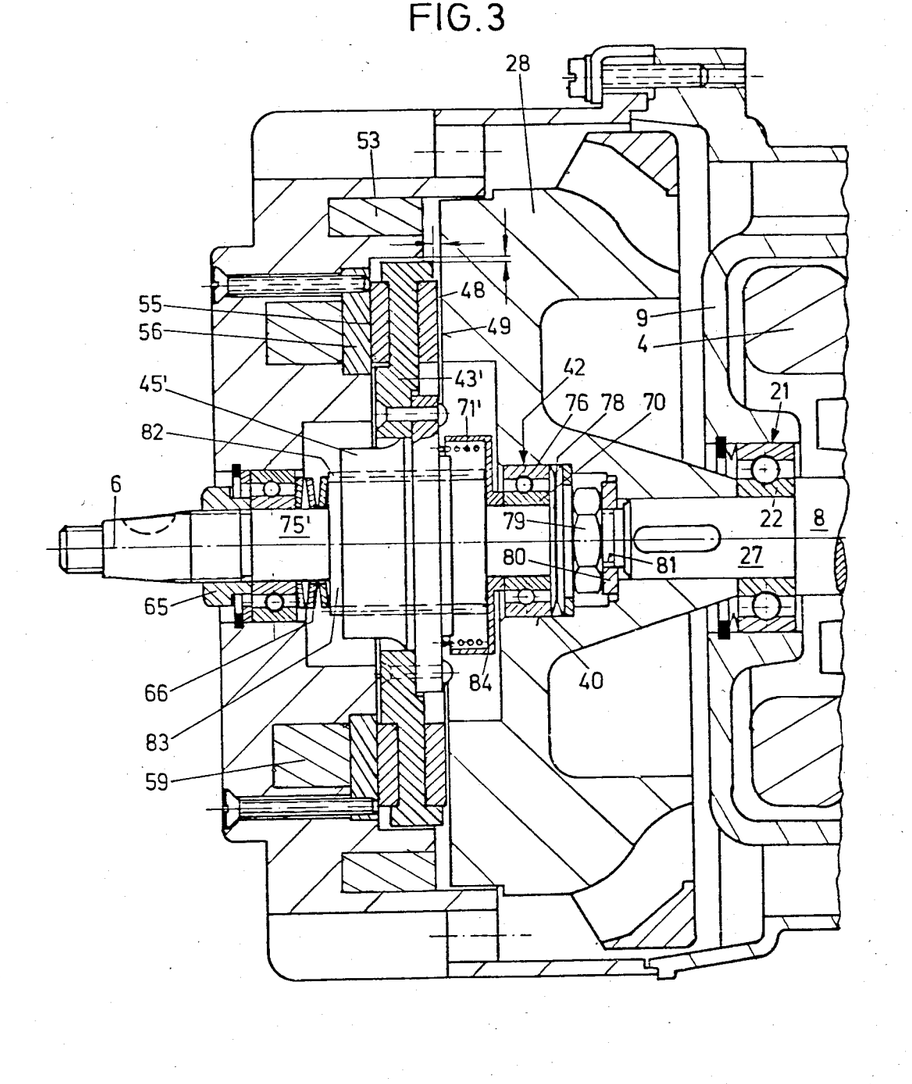
FIG. 3 shows a modified form of embodiment of a clutch/brake unit.

The exemplary embodiment shown in FIG. 3 differs from the exemplary embodiments of FIGS. 1 and 2 in only some respects. For this reason, the same reference numerals are used for the same elements, while the reference numerals for those elements having the same function but a different structure are provided with a prime. A new description of these similar elements will accordingly be omitted.

In the exemplary embodiment of FIG. 3, the disk flywheel 28 is tensed by means of a nut 79 having a shim 80 against the inner ring 22 of the rolling bearing 21, and the nut 79 is threaded onto a threaded tang 81 embodied on the shaft tang 27 of the motor shaft 8. The clutch/brake disk 43' in this embodiment is rigid, and its hub 45' is disposed in a rotationally fixed manner yet axially displaceably on a gear 82 of the driven shaft. An embodiment which is the equivalent of the brake adjustment device 68 of FIGS. 1 and 2 serves as the clutch adjustment device 75', the plate springs 66 being supported axially against a shaft section 83 carrying the gear 82.

The inner ring 70 of the rolling bearing 70 in this embodiment is supported via a support ring 84 against the end face of the gear 82. An elastic member 71' is also provided, which rests at one end on the support ring 84 and at the other end on the clutch/brake disk 43'. As a result, the clutch/brake disk 43' necessarily rests at one side against the brake support 56, exerting little force, when the clutch coil 53 and the brake coil 59 are not excited. On the other side, the disk flywheel 28 together with the motor shaft 8 and rotor 7 is axially displaced by the corresponding rotation of the adjusting nut 65, as a result of which the air gap between the clutch lining 48 and the clutch face 49 is adjusted. This embodiment furthermore makes it possible for the readjustment member 78, upon being heated, to perform a corresponding readjustment by displacing the outer ring 76 of the rolling bearing 42 relative to the bearing bore 40, so that—as already discussed above—the disk flywheel 28 is additionally moved, together with the motor shaft 8, from the clutch/brake disk 43.

Figure 4:
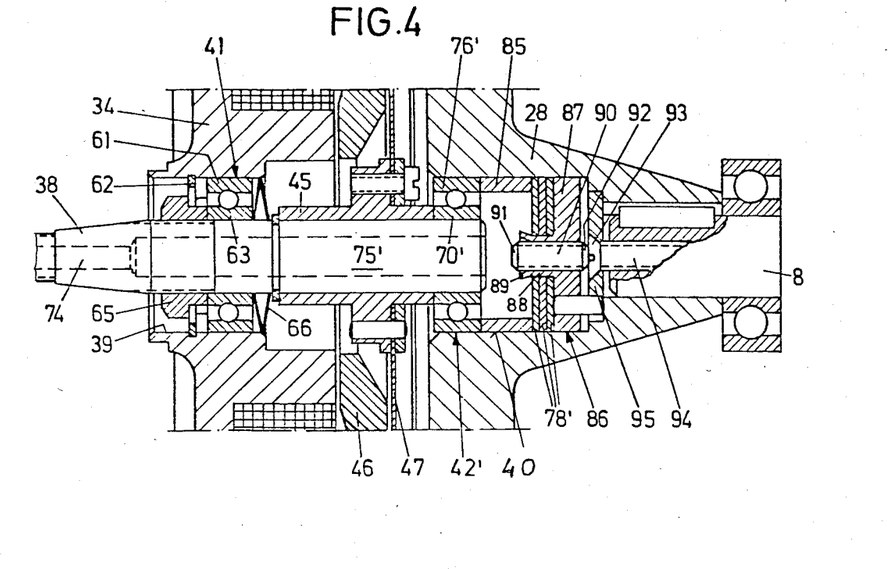
FIG. 4 is a detail, corresponding to FIG. 1, of a modified form of embodiment of the clutch adjustment device.

In the further exemplary embodiment of the clutch adjustment device 75' shown in FIG. 4, it is provided that the inner ring 70' of the rolling bearing 42' does not have a displaceable seat relative to the driven shaft 38, and that the outer ring 76' is disposed with a displaceable seat in the bearing bore 40 and is connected via a spacer ring 85 with the readjustment member 78'. The readjustment member 78' includes bimetallic disks, which are seated on a pressure piece 86. The pressure piece 86 includes a basic body 87, on which the bimetallic disks rest, and a hub-like protrusion 88, which passes through the bimetallic disks and the free end 89 of which is bent outward and holds the bimetallic disks. The protrusion 88 and the basic body 87 are pierced by a threaded bore, which receives a bolt-like adjusting screw 90 having an adjustment slit 91, the free end 92 of which rests on the head 93 of the fastening screw 94.

The disk flywheel 28 is connected via the disk 95 with the motor drive shaft 8 by means of the fastening screw 94. By actuating the adjusting screw 90, it is thus possible to adjust the axial gap "a," by adjusting the motor drive shaft 8, together with the disk flywheel 28, axially relative to the driven shaft 38. The basic concept such as has been described above in connection with FIGS. 1 and 2 remains unchanged, except for the above-described modifications.

Figure 5:
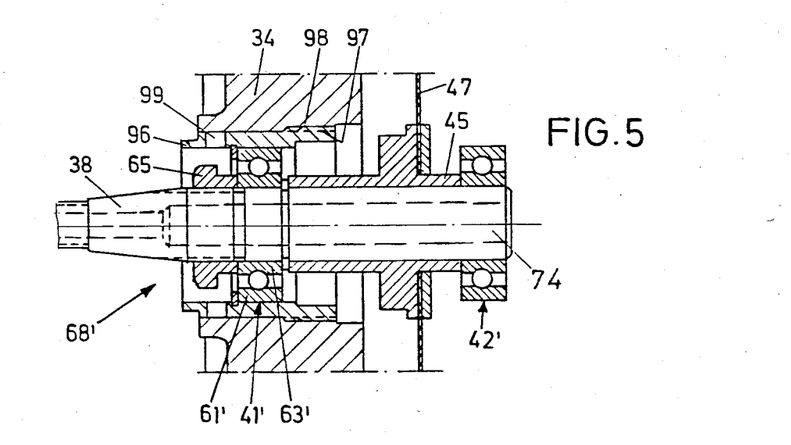
FIG. 5 is a detail, corresponding to FIG. 1, of a modified form of embodiment of the brake adjustment device.

In a modified form of embodiment of a brake adjustment device 68 shown in FIG. 5, the adjustment is effected not via the adjusting nut 65, which here serves solely as a means of axial fastening, but rather via an adjusting sheath 96. The adjusting sheath 96 has an outer thread 97, which engages the inside of a threaded bore 98 of the brake bearing bracket 34. The rolling bearing 41' has a fixed seat, with its inner ring 63', on the driven shaft 38, while the outer ring 61' is connected with the adjusting sheath 96 via a displaceable seat. A rotation can be effected, using a slender tool, via bores 99 of the adjusting sheath 96. As a result, an axial adjustment of the driven shaft 38 is attained relative to the brake bearing bracket 34.

Figure 6:
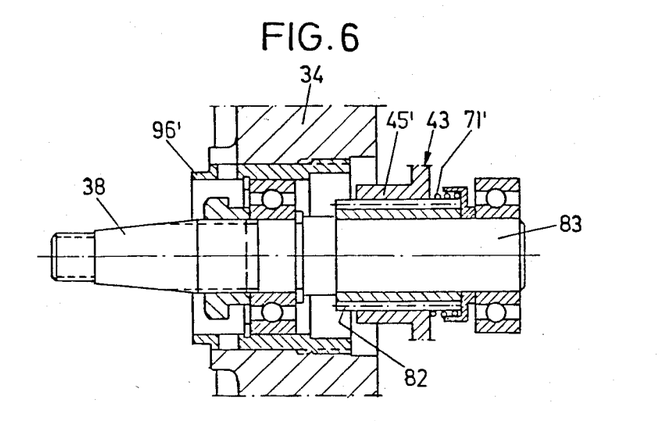
FIG. 6 is a detail, corresponding to FIG. 3, of a modified form of embodiment of a clutch adjustment device.

A form of embodiment shown in FIG. 6 corresponds in its basic structure to the form of embodiment of FIG. 3; in FIG. 6, a rigid clutch/brake disk 43 is disposed in an axially displaceable manner on a gear 82 of the driven shaft 38. The axial displacement of the hub 45', however, is effected in this embodiment via an adjusting sheath 96 in a manner analogous to the form of embodiment of FIG. 5.

Figure 7:
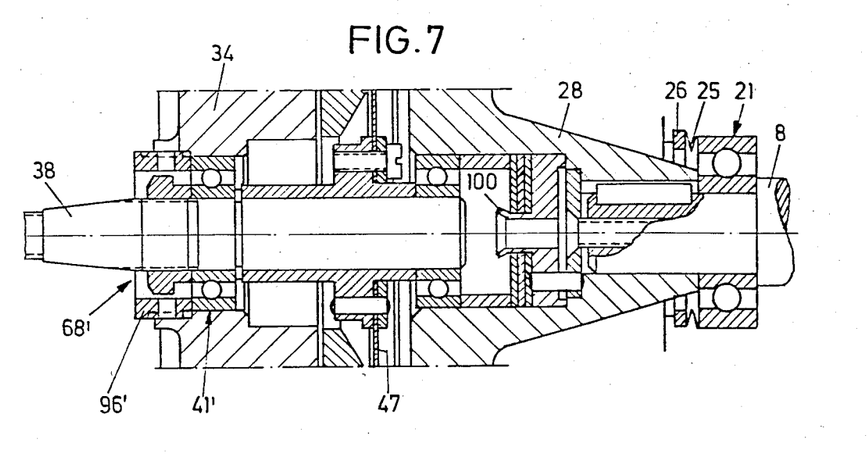
FIG. 7 shows a further form of embodiment of a clutch adjustment device.

In a further form of embodiment, shown in FIG. 7, in which separate adjustment of the clutch and the brake is not provided, the adjustment device is realized in a manner identical to that of FIG. 5, and the transitional zone between the motor drive shaft 8 and the driven shaft 38 is embodied in accordance with FIG. 4; however, in contrast to this, the driven shaft 38 does not have any bore 74, and instead of the adjusting screw 90 a fixed rivet 100 is provided. An adjustment of the clutch play can thus be undertaken via the adjusting sheath 96' in cooperation with the forces of the annular springs 17 and the elastic spider 47. In order to assure satisfactory functioning of the brake independently of the clutch adjustment in this embodiment, the spring force dimensioning of the spider 47 must be designed such that an axial bending of this element of up to 1 mm can be effected, while taking into consideration the torque to be transmitted, yet without any notable change occurring in the torque to be exerted at the driven shaft 38 when the brake lining comes into contact with the brake support 56. This is particularly important in enabling the free adjustment of the sewing machine hand wheel when the brake coil 59 is switched off.

The last form of embodiment described above is distinguished by being particularly economical both in terms of its manufacture and in servicing it.

It is to be understood that the foregoing text and drawing relate to embodiments of the invention given by way of example but not limitation. Various other embodiments and variants are possible within the spirit and scope of the invention.

What is claimed is:

1. An electromotive control drive for a sewing machine, comprising a motor capable of continuous drive, a driven output shaft, and a clutch/brake unit selectively interconnecting said motor and said driven shaft, said clutch/brake unit comprising a single clutch/brake disk, said disk comprising clutch disk means, means to fix said disk to said driven shaft, clutch lining means fixed to the rotor of said motor and normally positioned with an air gap between said clutch lining means and said clutch disk means, means to automatically readjust the size of said clutch air gap, said single disk further comprising brake means adapted to frictionally contact a fixed portion of said drive to brake the motion of said motor and separate clutch coil means and brake coil means for individually operating said single disk to operate the brake and the clutch of said drive.

2. A drive mechanism as defined by claim 1, wherein said clutch lining means is adjustable relative to the clutch/brake disk.

3. A drive mechanism as defined by claim 2, wherein said driven shaft and said clutch lining means are axially interconnected and that said clutch lining means is axially displaceable.

4. A drive mechanism as defined by claim 3, wherein said clutch/brake disk is axially resilient and the hub of which is fixed to the driven shaft, and clutch adjustment means actuatable through a bore in the driven shaft is provided for the axial displacement of the clutch lining means.

5. A drive mechanism as defined by claim 4, characterized in that the driven shaft is axially adjustable relative to the brake coil means.

6. A drive mechanism as defined by claim 3, wherein said clutch/brake disk is axially rigid and displaceably disposed on the driven shaft, and means to permit the driven shaft to be axially adjustable relative to the brake coil means.

7. A drive mechanism as defined by claim 3, wherein the driven shaft is supported relative to the rotor by means of bearing means, and readjustment means disposed between the rotor and the bearing means.

8. A drive mechanism as defined by claims 1 or 7, wherein a heat responsive bimetallic member is provided as the readjustment means.

9. A drive mechanism as defined by claim 1, wherein said brake coil is disposed in a brake support and said clutch coil is dosposed in a clutch support, said clutch/brake disk is provided with an armature ring, and the clutch coil means is also disposed in the brake support and is magnetically connected with the clutch support.

10. A drive mechanism as defined by claim 9, wherein at least one magnetic pole of the clutch coil means radially surrounds the clutch/brake disk.

11. A drive mechanism as defined by claim 9 or 10, characterized in that at least one magnetic pole of said clutch support radially surrounds the clutch lining means at least partially.

12. A drive mechanism as defined by claim 4, characterized in that the clutch adjustment means has an elastic member acting counter to the hub of the clutch/brake disk and includes a threaded bore, and an adjusting screw, the free end of which acts to move the motor shaft and rotor.

13. A drive mechanism as defined by claim 12, said adjusting screw having a head which protrudes beyond a support to act to move the motor shaft and rotor.

14. A drive mechanism as defined by claim 12, wherein the free end of the adjusting screw is supported in the vicinity of the end face of the motor shaft.

15. A drive mechanism as defined by claim 5, wherein the driven shaft is axially connected with an adjusting sheath engaging a thread of the brake support means.

16. A drive mechanism as defined by claim 15, wherein the hub of the clutch/brake disk is axially connected with the driven shaft, and the spring characteristic curve of the axially resilient clutch/brake disk has a flat section, at least in the initial portion.

17. A drive mechanism as defined by claim 1, wherein said clutch and said brake coil means cause axial motion of at least a portion of said single disk.

18. A drive mechanism as defined by claim 1, wherein the clutch lining means are fixed to the flywheel of said motor.

* * * * *